May 23, 1950 J. E. BECKER 2,508,442
FLUID CIRCULATION CONTROL FOR FLUID COUPLINGS
Filed May 21, 1947 4 Sheets-Sheet 1
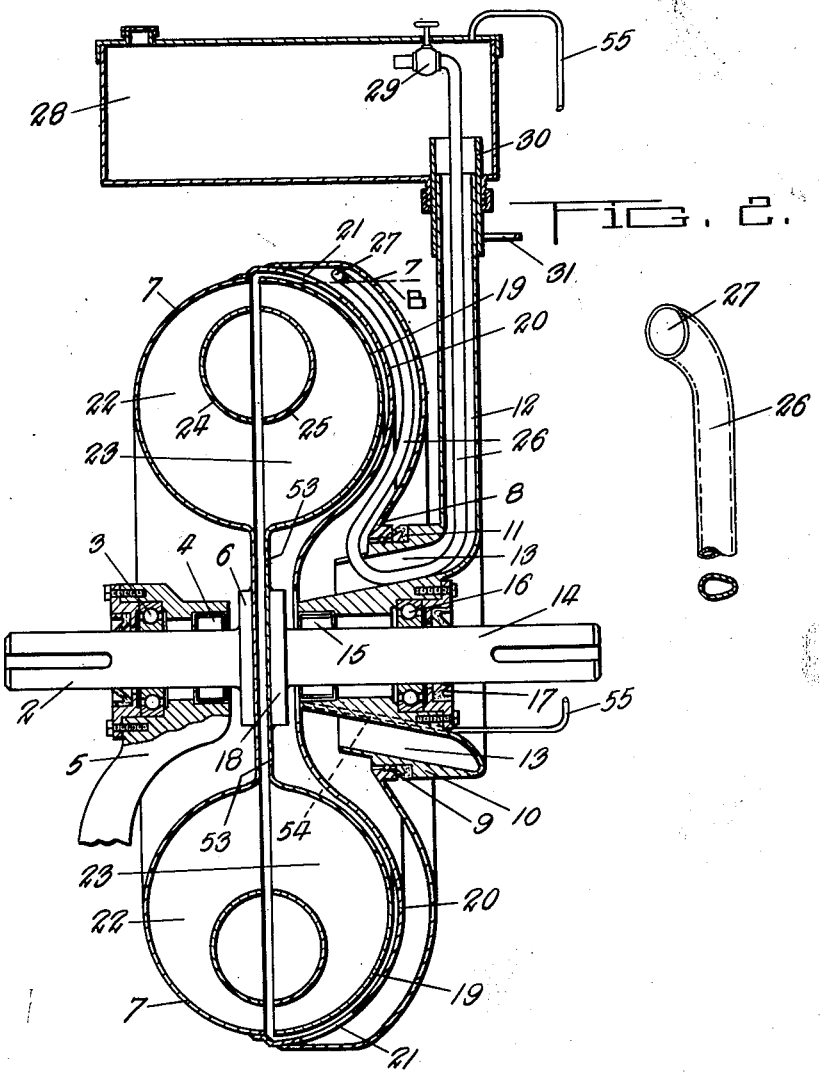
Inventor
JOHN E. BECKER
By
Attorney

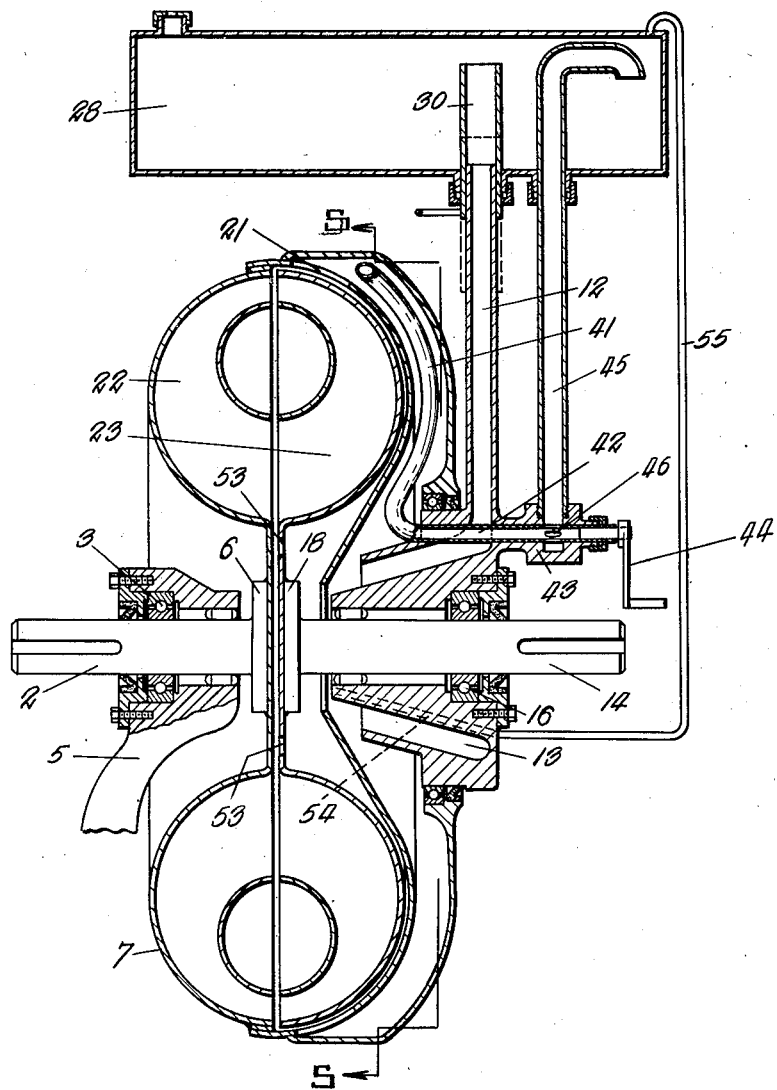

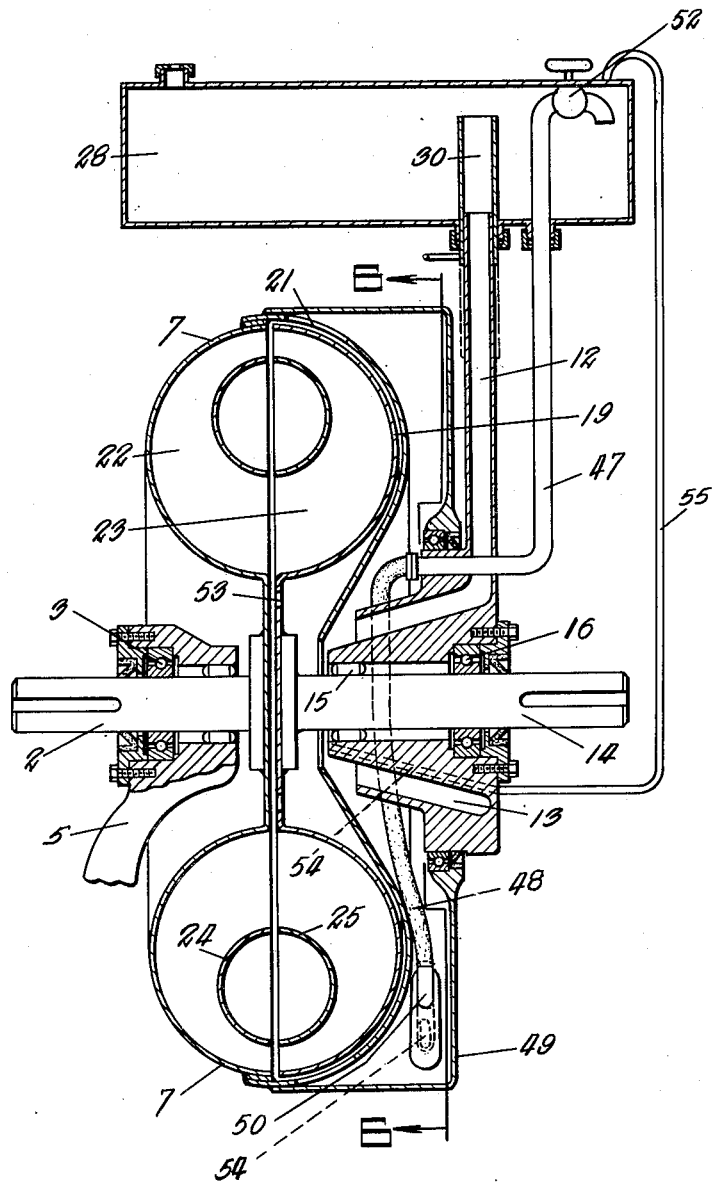

May 23, 1950  J. E. BECKER  2,508,442
FLUID CIRCULATION CONTROL FOR FLUID COUPLINGS
Filed May 21, 1947  4 Sheets-Sheet 4
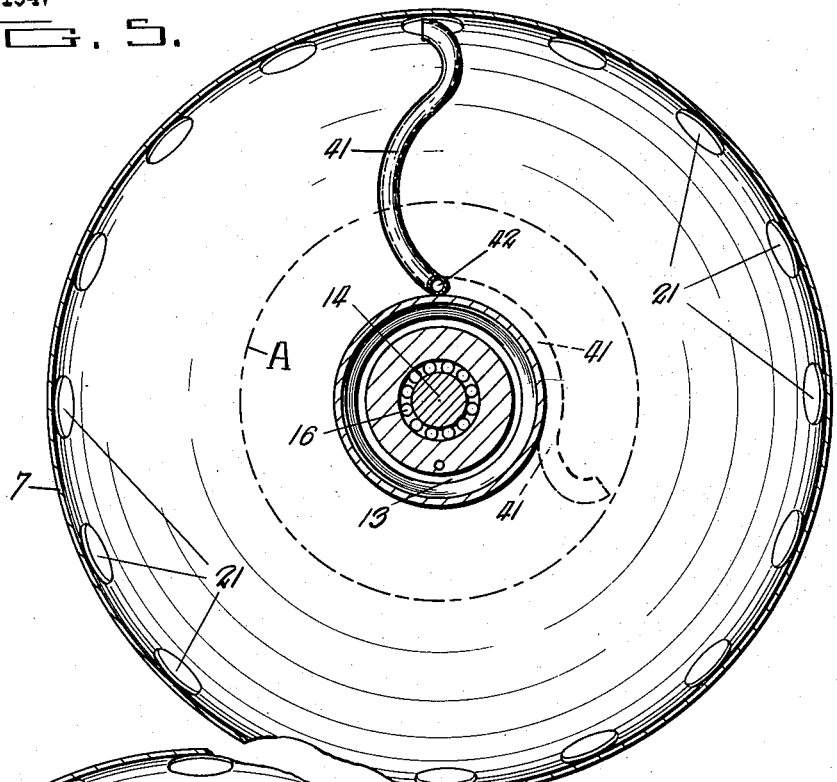
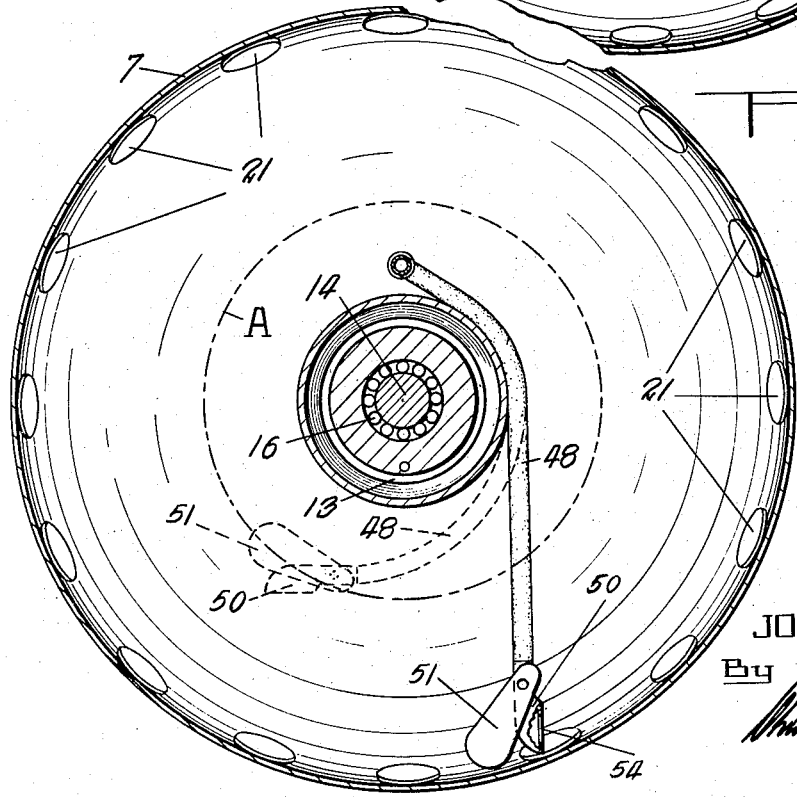
Inventor
JOHN E. BECKER
By
Attorney Patented May 23, 1950

2,508,442

UNITED STATES PATENT OFFICE 2,508,442

FLUID CIRCULATION CONTROL FOR FLUID COUPLINGS

John Edward Becker, Toronto, Ontario, Canada

Application May 21, 1947, Serial No. 749,562

4 Claims. (Cl. 60—54)

The invention relates to improvements in fluid circulation controls for fluid couplings wherein a rotatable fluid tight housing constitutes the impeller blade containing shell and in which the runner blade containing shell is housed; the object of the invention being to combine the foregoing assembly with a fluid discharge member having a scooping action and which is contained within the rotatable housing to remain in a stationary position relative to the rotatable housing and discharge fluid therefrom and direct it into a reservoir, and to also provide a fluid return conduit from said reservoir and communicating with the rotatable housing. A suitable fluid flow control is incorporated in the fluid return conduit, and if desired a valve control may be provided in the scoop member.

A further and particular object of the invention is to provide alternative scoop constructions wherein the fluid discharge scoop member may be manually adjusted in position within the rotatable housing, and also wherein the open fluid inlet end of a flexible fluid discharge scoop member is supported by a float resting on the surface of the fluid in the rotatable housing.

With the foregoing and other objects in view, as shall hereinafter appear, my invention consists of a fluid coupling constructed and arranged all as hereinafter more particularly described and illustrated in the accompanying drawings in which:

Fig. 1 is a vertical longitudinal cross-sectional view through the coupling.

Fig. 2 is an enlarged fragmentary perspective view of the scoop member as incorporated in the mechanisms shown in Fig. 1.

Fig. 3 is a similar view to Fig. 1 and showing a construction whereby the scoop member may be manually swung within the rotatable housing.

Fig. 4 is also a similar view to Fig. 1 and showing a downwardly directed flexible scoop member having its open fluid inlet end supported by a float which is provided to rest upon the surface of the fluid in the rotatable housing.

Fig. 5 is a vertical cross-sectional view taken through the line 5—5, Fig. 3, and Fig. 6 is a vertical cross-sectional view taken through the line 6—6, Fig. 4.

Like characters of reference indicate corresponding parts in the different view of the drawings.

Referring to Fig. 1, the driving shaft 2 is supported by ball and roller races 3 and 4 carried within a suitably supported bearing bracket 5. The inner end of the driving shaft 2 is formed with a flange 6, and an impeller housing 7 of orbicular form and of substantially 8-shaped cross section is secured to the face of the flange to rotate with the driving shaft 2. The end portion 8 of the housing, remote from the portion secured to the flange 6, is carried by a ball bearing 9 mounted upon a stationary hub shell 10. A fluid seal ring 11 is positioned adjacent to the ball bearing 9. A fluid feed pipe 12 extends upwardly from the hub shell 10, being in communication with an annular chamber 13 formed within the hub shell and opening into the impeller housing 7.

The hub shell 10 contains the driven shaft 14 which is mounted within roller and ball races 15 and 16, and a fluid seal ring 17 is also provided. The inner end of the driven shaft 14 carries a flange 18, and a concave ring shaped runner housing 19 is secured to the flange, being positioned within the impeller housing 7. The impeller housing 7 contains a partition wall 20 which is of a shape to follow the contour of the runner housing 19. The outer edge of the partition 20 is welded or otherwise secured to the inner face of the peripheral wall of the housing 7 and its centre is formed with an orifice of greater diameter than the driven shaft 14, and through which the driven shaft extends. The outer portion of the partition wall 20 is pierced with a plurality of orifices 21 through which fluid passes when being injected into and evacuated from the coupling.

The impeller housing 7 and the runner housing 19 carry a plurality of the usual radial impeller blades 22 and 23, and support the usual ring members 24 and 25, so that passages are formed for the fluid transmission of power. In order to withdraw fluid from the coupling a radial discharge pipe 26 is provided.

The pipe 26 passes through the annular chamber 13 and its inner portion extends radially between the wall of the housing 7 and the partition 20, following the curvature thereof. The outer end of the inner portion of the pipe 26 contains the fluid inlet orifice 27. In order to reduce the fluid friction between the pipe and the fluid contained in the rotating impeller housing 7, the inner portion of the pipe 26 is of pear-shaped or streamlined cross section, as shown in Fig. 2. The outer portion of the pipe 26 extends upwardly within the fluid feed pipe 12 and opens into a reservoir 28 positioned above the coupling assembly. A control valve 29 is carried in the upper end of the pipe. The upper end of the fluid feed pipe 12 which also extends to the reservoir 28 is contained within a slidable regulating sleeve 30 which projects upwardly into the reservoir, and may be adjusted in height by means of a handle 31.

To enable air to readily escape from the impeller housing 7, when fluid is admitted into the housing from the annular chamber 13 and passes outwardly between the rear wall of the housing 7 and the partition 20 and through the orifices 21 in the partition; air escape orifices 53 are furnished in the inner portion of the runner housing 19 and the air passes therefrom through a passage 54 in the shell 10 and from thence through the pipe 55 into the reservoir 28.

*Operation*

Fluid is contained within the reservoir 28 and is admitted to the coupling through the feed pipe 12. The quantity of fluid admitted is governed by adjustment of the height of the slidable regulating sleeve 30. When the top of the regulating sleeve is below the level of the fluid in the reservoir, fluid will flow downwardly through the pipe 12 until the fluid level in the reservoir coincides with the top of the sleeve. To put the coupling as shown in Fig. 1, into operation, fluid is permitted to pass from the reservoir into the impeller housing 7. As well as centrifugally filling the peripheral portion of the space between the partition wall 20 and the end wall of the housing 7, the fluid will also flow through the orifices 21 and through the clearances provided into the bladed portion of the impeller housing and into the runner housing 19. When the driving shaft 2 is put in motion, the fluid rotating from the impeller blades 22, will impact the runner blades 23, with the resultant rotation of the runner and the driven shaft 14. It will be appreciated that the complete coupling assembly, with the exception of the bearing assembly supports, will be rotating. The inner end of the radial discharge pipe 26 is stationary and its inlet orifice 27 is directed towards the direction of rotation, so that the rotating movement of the coupling tends to direct the fluid into the pipe. If the valve 29 is closed there will be no passage of fluid through the pipe 26 and the quantity of fluid in the coupling will remain constant.

To remove a portion of the fluid from the coupling in order to reduce the speed of the driven shaft 14, relatively to the speed of the driving shaft 2, it is only necessary to open the valve 29 to the desired extent. Fluid will then be evacuated from the coupling through the orifices 21, and scooped out of the impeller housing through the open end 27 of the pipe 26. The return of fluid to the coupling is controlled by regulation of the height of the sleeve 30. As the pipe 26 discharges into the reservoir 28, from which reservoir fluid may be fed into the coupling through the feed pipe 12, it will be seen that fluid may be continuously withdrawn from the coupling into the reservoir and fed from the reservoir into the coupling. The proportion of fluid withdrawn to the proportion of fluid returned is regulated by adjustment of the valve 29 and sleeve 30. In this manner any driven shaft speed can be obtained and retained, ranging from substantially the speed of the driving shaft, to reducing the driven shaft speed to a standstill.

A particular feature of my construction is to so dimension the assembly that the orifice 27 in the pipe 26 is positioned beyond the outside extremity (line B, Fig. 1) of the fluid path in the impeller housing so that the orifice 27 is always completely submerged in fluid, thus avoiding output R. P. M. variations and aeration of the fluid.

In Figs. 3 and 5 I show an alternative fluid discharge construction whereby fluid is removed from the coupling. In this construction I dispense with the control valve 29 and provide an arrangement whereby the open end scoop may be swingably removed from out of the fluid contained in the coupling.

The scoop pipe 41 is of the same form as the inner end of the scoop pipe 26 as previously described. The portion 42 of the scoop pipe 41 is rotatably mounted within a bracket 43, being closed at its outer end and carrying an operating handle 44. The fluid outlet pipe 45 extends upwardly from the bracket 43 and empties into the reservoir 28. The portion 42 of the scoop pipe 41 is formed with a plurality of orifices 46 through which fluid may pass from the pipe portion 42 into outlet pipe 45.

It will be appreciated that when the coupling is in operation, with fluid therein, that the fluid will be centrifugally positioned in the form of a fluid ring having a surface such as the dotted line A shown in Fig. 5. In order to remove the scoop pipe 41 out of, or partly out of, the fluid ring in the impeller housing 7, it is only necessary to turn the handle 44 whereby the scoop pipe 41 may be swung from the position shown in full lines in Fig. 5 to the position shown in dotted lines. It will thus be perceived that when the coupling is in operation without fluid being bled therefrom that the scoop pipe will be in the position shown in dotted lines in Fig. 5, and if it is desired to remove fluid from the coupling that a movement of the scoop pipe in a counter-clockwise direction will cause the open end of the scoop pipe to enter the fluid ring so that as the scoop pipe is swung the fluid will be removed at a sufficient speed to eliminate the necessity of having the scoop pipe project into the fluid for any appreciable depth whereby turbulence which might be caused by the scoop pipe projecting into the fluid, is eliminated.

In Figs. 4 and 6 I illustrate a further modification of scoop pipe construction, and wherein such pipe is formed of an upper rigid portion 47 which extends upwardly into the reservoir 28 and a lower flexible portion 48 which hangs downwardly within the impeller housing 7. In this construction, the rear part 49 of the impeller housing is of slightly enlarged form to accommodate the lower flexible portion 48 of the scoop pipe.

The flexible portion 48 of the scoop pipe is formed of rubber hose or any other similar form of flexible tubing, and carries a scoop member 50 upon its free end. The scoop member is formed with a fluid inlet orifice 54 through which fluid may pass into the portion 48 of the scoop pipe. A float 51 is swingably attached to the scoop member 50 and has sufficient buoyancy to float upon the surface A of the fluid ring. It will thus be appreciated that the scoop member 50 is the only part of the fluid bleeding assembly which projects into the fluid ring at any time during the coupling operation, whereby fluid turbulance which might be caused by the fluid bleeding element is practically eliminated.

When the coupling is filled with fluid and the valve 52 in the pipe 47 is closed, there will be no passage of fluid through the pipes 48 and 47 and the pipe portion 48 of the scoop member 50 will be in position shown in dotted lines in Fig. 6, wherein the float 51 is resting upon the surface of the fluid ring. If it is desired to remove fluid from the coupling, the valve 52 is opened, and as fluid passes out of the coupling through the pipes 48 and 47, the flexible pipe 48 will swing downwardly as the fluid ring decreases until it may come into the position shown in full lines in Fig. 6, when the coupling has been emptied. The return of the fluid to the coupling is regulated by adjustment of the sleeve 30 in the reservoir 28 as previously described.

While I have shown certain embodiments of my invention, it is to be understood that I may make such changes and alterations as I may at any time deem necessary, without departing from the spirit of my invention as set forth in the appended claims.

What I claim as my invention is:

1. A fluid coupling comprising a driving rotatable impeller housing having a plurality of radial impeller blades therein, a driven runner housing having a plurality of radial runner blades therein, said runner housing being contained within the impeller housing, a fluid containing chamber forming part of the impeller housing and rotating therewith and communicating with the blade containing portion of the impeller housing through a plurality of orifices through each of which orifices fluid enters and leaves the blade containing portion of the impeller housing, a fluid reservoir, a conduit for directing fluid from the reservoir into the fluid containing chamber and from where the fluid passes through the orifices into the blade containing portion of the impeller housing, and an open ended flexible scoop pipe positioned within the fluid containing chamber for discharging fluid therefrom into the reservoir, said scoop pipe being swingable in relationship to the surface of the centrifugal fluid ring in the fluid containing chamber.

2. A fluid coupling as claimed in claim 1, wherein the scoop pipe extends from the central portion of the coupling and is flexible and swingable in relationship to the surface of the fluid ring in the fluid containing chamber and a float attached to the outer end of the scoop pipe and floating upon the surface of the fluid ring.

3. A fluid coupling as claimed in claim 1, wherein the scoop pipe extends from the central portion of the coupling and is flexible and swingable in relationship to the surface of the fluid ring in the fluid containing chamber, and a float attached to the outer end of the scoop pipe and floating upon the surface of the fluid ring, the float being so positioned that the open end of the scoop pipe is beneath the surface of the fluid ring.

4. A fluid coupling as claimed in claim 1, wherein the scoop pipe extends from the central portion of the coupling and is flexible and swingable in relationship to the surface of the fluid ring in the fluid containing chamber, and wherein the runner housing is formed with air exit orifices in its central portion, and an air outlet passage extends from the impeller housing.

JOHN EDWARD BECKER.

REFERENCES CITED

The following references are of record in the file of this patent:

UNITED STATES PATENTS

| Number | Name | Date |
| --- | --- | --- |
| 1,859,607 | Sinclair | May 24, 1932 |
| 1,881,083 | Kiep | Oct. 4, 1932 |
| 1,882,222 | Lewis | Oct. 11, 1932 |
| 1,987,985 | Bauer | Jan. 15, 1935 |
| 2,062,281 | Alison | Dec. 1, 1936 |
| 2,078,597 | Beaumont | Apr. 27, 1937 |
| 2,141,940 | Sinclair | Dec. 27, 1938 |
| 2,202,243 | Alison | May 28, 1940 |
| 2,380,595 | Hertrich | July 31, 1945 |
| 2,423,812 | Karl et al. | July 8, 1947 |